United States Patent [19]

Auwaerter et al.

[11] Patent Number: 5,697,554
[45] Date of Patent: Dec. 16, 1997

[54] METERING VALVE FOR METERING A FLUID

[75] Inventors: Gerhard Auwaerter, Stuttgart; Katsuoki Itoh, Leonberg; Rudolf Heinz, Renningen; Winfried Moser, Ludwigsburg; Christoph Franke, Wolfenbüttel, all of Germany

[73] Assignee: Robert Bosch GmbH, Stuttgart, Germany

[21] Appl. No.: 581,959

[22] Filed: Jan. 2, 1996

[30] Foreign Application Priority Data

Jan. 12, 1995 [DE] Germany ............... 195 00 706.9

[51] Int. Cl.[6] ................................................ F02M 51/06
[52] U.S. Cl. ................................................ 239/88; 239/584
[58] Field of Search ........................ 239/88, 584, 585.1

[56] References Cited

U.S. PATENT DOCUMENTS

| | | | |
|---|---|---|---|
| 4,022,166 | 5/1977 | Bart | 239/584 |
| 4,544,096 | 10/1985 | Burnett | 239/88 X |
| 5,452,858 | 9/1995 | Tsuzuki et al. | 239/584 X |
| 5,495,957 | 3/1996 | Sturman | 239/88 |

FOREIGN PATENT DOCUMENTS

| | | |
|---|---|---|
| 0324905 | 7/1989 | European Pat. Off. . |
| 0371469 | 6/1990 | European Pat. Off. . |
| 0477400 | 1/1992 | European Pat. Off. . |
| 3533085 | 3/1987 | Germany . |

*Primary Examiner*—Lesley D. Morris
*Attorney, Agent, or Firm*—Edwin E. Greigg; Ronald E. Griegg

[57] ABSTRACT

A metering valve for metering a fluid for a fuel injection valve for internal combustion engines, with a hydraulic displacement amplifier for converting the actuating displacement of a piezoelectric actuator into an increased stroke of the valve needle. Integrating the displacement amplifier spatially into the valve housing in an "O valve" to give a small overall volume is served by providing the lifting piston of the displacement amplifier with an end section of reduced diameter which projects into a recess in the operation piston of the displacement amplifier. A Belleville spring lying in the amplifier chamber bounded by the pistons presses the operating piston against the actuator, and a helical compression spring arranged in the recess concentrically to the end section presses the lifting piston against the valve needle.

20 Claims, 7 Drawing Sheets

METERING VALVE FOR METERING A FLUID

PRIOR ART

The invention sets forth a metering valve for metering liquids or gases, especially an injection valve for fuel injection systems of internal combustion engines such as direct-injection diesel engines.

In a known metering valve designed as an injection valve for fuel injection systems (DE 35 33 085 A1), the aim of compensating the effects of temperature changes, wear and manufacturing tolerances on the actuating displacement of the piezoelectric actuator that directly drives the valve needle is served by arranging a hydraulic damping space at that end of the actuator which is remote from the valve needle, the said damping space being bounded by a damping piston rigidly connected to the actuator. The damping space is connected by at least one restrictor gap to a compensating space. The volume made available by the damping space, the restrictor gap and the compensating space is filled with liquid and closed off, the system pressure being regulated with the aid of an overflow valve. By means of this encapsulated damping system, it is possible to ensure a liquid cushion which is completely incompressible and constant in volume in the face of brief dynamic pressure effects such as those produced by the expansion of the actuator upon application of an excitation voltage. Quasi-static processes such as changes in the length of the actuator due to temperature changes, wear and manufacturing tolerances, on the other hand, cause a displacement of the damping piston by displacement of liquid through the restrictor gap and hence compensation thereof, with the result that the constant actuating displacement of the actuator is not affected.

EP 0 477 400 A1 has disclosed a displacement transformer or displacement amplifier for a metering valve of this kind which converts the relatively small actuating displacement of the actuator into a larger stroke of the valve needle. In this arrangement, the deflection of the actuator is introduced into the amplifier chamber by way of the operating piston of the displacement amplifier and is transmitted by the lifting piston to the valve needle, which executes an increased stroke in proportion to the ratio of the piston areas bounding the amplifier chamber at the ends. To compensate for temperature effects, wear and manufacturing tolerances on the actuating displacement of the actuator, the hydraulic chamber has a defined leakage, which is achieved by means of an annular gap between the pistons and the respective valve housing wall and which has a sufficiently high flow resistance. The defined leakage has a leakage rate which is dependent on the maximum stroke time of the actuator.

ADVANTAGES OF THE INVENTION

The metering valve according to the invention has the advantage of spatial integration of a displacement amplifier into a metering valve with the small overall volume which that entails, both in the form of an outward-opening valve with a valve seat arranged on the outside of the housing ("O valve") and in the form of an inward-opening valve with a valve seat arranged in the interior of the housing ("I valve"), which, in particular, permits a small overall length of the valve. The constructional integration meets the requirement for a rapidly closing valve and, at the same time, the risk of cavitation in the amplifier chamber of the hydraulic displacement amplifier during rapid closure is largely counteracted.

In the constructional integration of the displacement amplifier into an "O valve", the lifting piston and the valve needle are separated from one another. Two compression springs ensure that the actuator, the amplifier piston and the valve needle rest against one another without play and move jointly during the opening of the metering valve. During closure, the lifting piston separates from the valve needle, thereby enabling the lifting piston, which preferably has a small mass, to follow the actuator movement or movement of the operating piston connected to the latter very rapidly, thus preventing any significant temporary increase in the volume of the amplifier chamber, which is the cause of cavitation phenomena.

In the constructional integration of the displacement amplifier into an "I valve", the required opposed motion of the actuator and the valve needle during the opening and closure of the metering valve is achieved by the fact that the lifting piston is part of the valve needle and that the amplifier pistons are arranged concentrically to one another, the amplifier chamber having an annular space which surrounds the lifting piston and is arranged at that end of the operating piston which is remote from the actuator. A compression spring, which presses the operating piston against the actuator, and the valve-closing spring ensure that the actuator, the amplifier pistons and the valve needle move jointly during the opening and closure of the metering valve. The risk of cavitation during the rapid closure of the I valve is countered exclusively by means of an overpressure in the amplifier chamber which is greater than the vapour pressure of the liquid which fills the amplifier chamber.

Advantageous developments and improvements of the metering valve specified herein are possible by virtue of the measures presented hereinafter.

In both types of metering valve, the effects of temperature changes, wear and manufacturing tolerances on the actuating displacement of the actuator can be compensated for by providing a respective liquid-filled hollow-cylindrical restrictor gap between the amplifier pistons themselves, on the one hand, and between the amplifier pistons and, in each case, the inner wall of the valve housing, on the other hand, via which restrictor gap the amplifier chamber is connected to a liquid-filled low-pressure space. The volume provided by the amplifier chamber, the restrictor gaps and the low-pressure space is closed off, the liquid in it being under a pressure of about 2–50 bar.

BRIEF DESCRIPTION OF THE DRAWINGS

The invention is explained in greater detail in the following description with reference to exemplary embodiments illustrated in the drawing, in which.

DETAILED DESCRIPTION OF THE EXEMPLARY EMBODIMENTS

Figure 1:
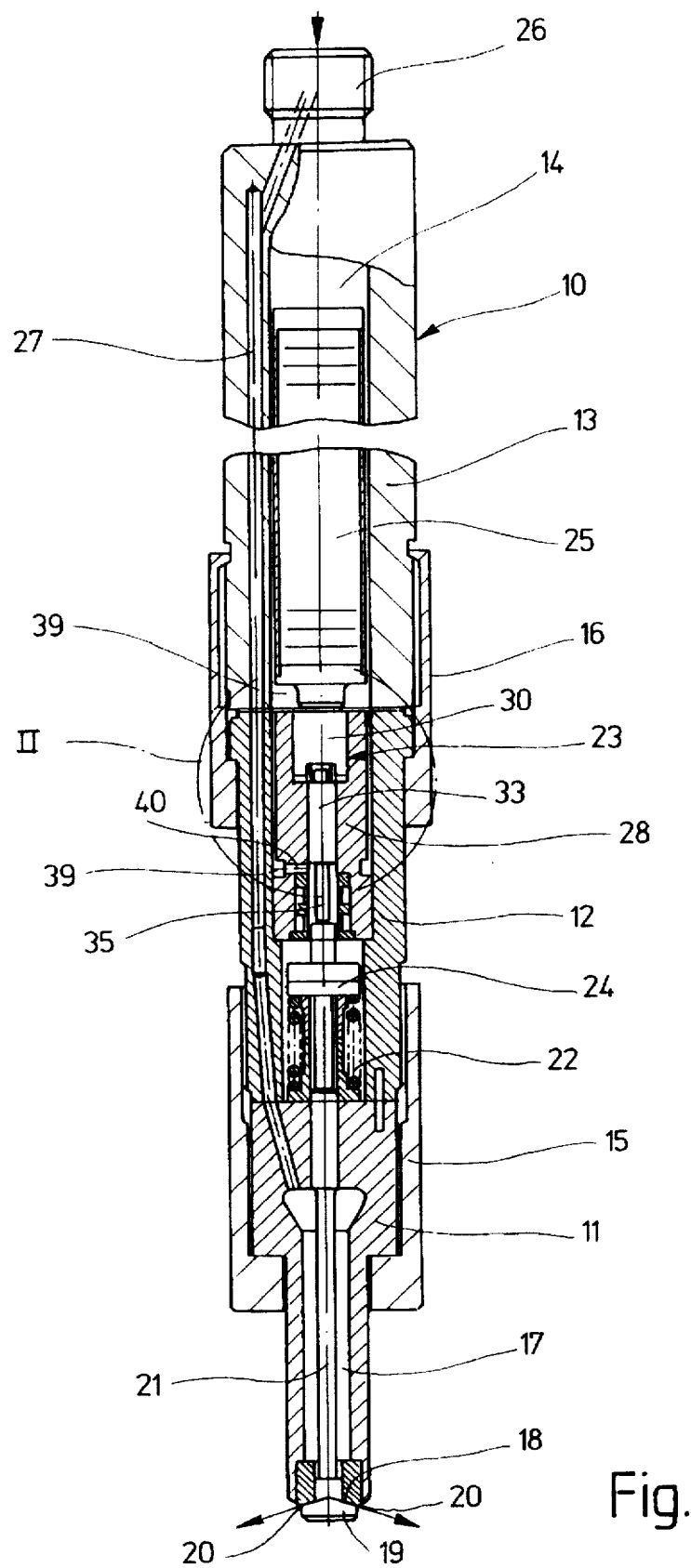
FIG. 1 shows a longitudinal section of a fuel injection valve designed as an O-valve.

The injection valve, sketched in longitudinal section in FIG. 1, for a fuel injection system of internal combustion engines as a specific exemplary embodiment of a more generally conceived metering valve for metering liquids or gases has a housing 10 comprising three housing parts 11, 12, 13 which are placed one upon the other, end to end, and in each case joined together by sleeves 15, 16. The lower housing part 11 forms what is referred to as the valve body, which has an axial hole 17 with two hole sections of different diameters and at the bottom end of which a valve seat 18 is formed on the outside of the valve body 11. A valve member 19 is seated on the valve seat 18 and seals off a metering opening 20 which is designed as a spray hole, which can be opened in the course of the opening stroke of the valve member 19 and into which the axial hole 17 emerges. The valve member 19 is formed integrally on a valve needle 21 which is arranged in the axial hole 17 and is guided in axially displaceable fashion in the smaller-diameter hole section of the axial hole 17. The hollow-cylindrical central housing part 12 accommodates a valve-closing spring 22 and a hydraulic displacement transformer or displacement amplifier 23. The valve-closing spring 22, which is designed as a helical compression spring, concentrically surrounds the valve needle 21, which also projects into the central housing part 12, and is supported, on the one hand, on a spring plate 24 rigidly connected to the valve needle 21 and, on the other hand, on the end of the valve body 11. The hydraulic displacement amplifier 23, which is described in detail below, connects the valve needle 21 to a piezoelectric or magnetostrictive actuator 25, which is accommodated in a pocket-type recess 14 in the upper housing part 13. A connecting stub 26 for a fuel-filled injection delivery line at high pressure is provided at the upper end of the upper housing part 13. As indicated schematically in FIG. 1, the connecting stub 26 is connected to the larger-diameter hole section of the axial hole 17 in the lower housing part 11, referred to as the "valve body", by a connecting hole 27 running through the housing parts 13, 12 and 11.

When the actuator 25 is not excited, the valve member 19 on the valve needle 21 is pressed onto the valve seat 18 surrounding the metering opening 20 on the outside of the valve body 11. The valve is closed. If an excitation voltage is applied to the actuator 25, the actuator 25 moves by an actuating displacement in accordance with the magnitude of the excitation voltage applied. This actuating displacement is transmitted via the displacement amplifier 23 to the valve needle 21, which executes a corresponding needle stroke, the latter, however, being larger than the corresponding actuating displacement of the actuator 25 owing to the displacement transformation or displacement amplification by the displacement amplifier 23. The valve member 19 moves from the valve seat 18 and exposes a metering cross section of the metering opening 20, the size of which depends on the stroke of the valve needle 21. An injection valve of this kind, with an outward-opening valve needle, is referred to as an "O-valve".

Figure 2:
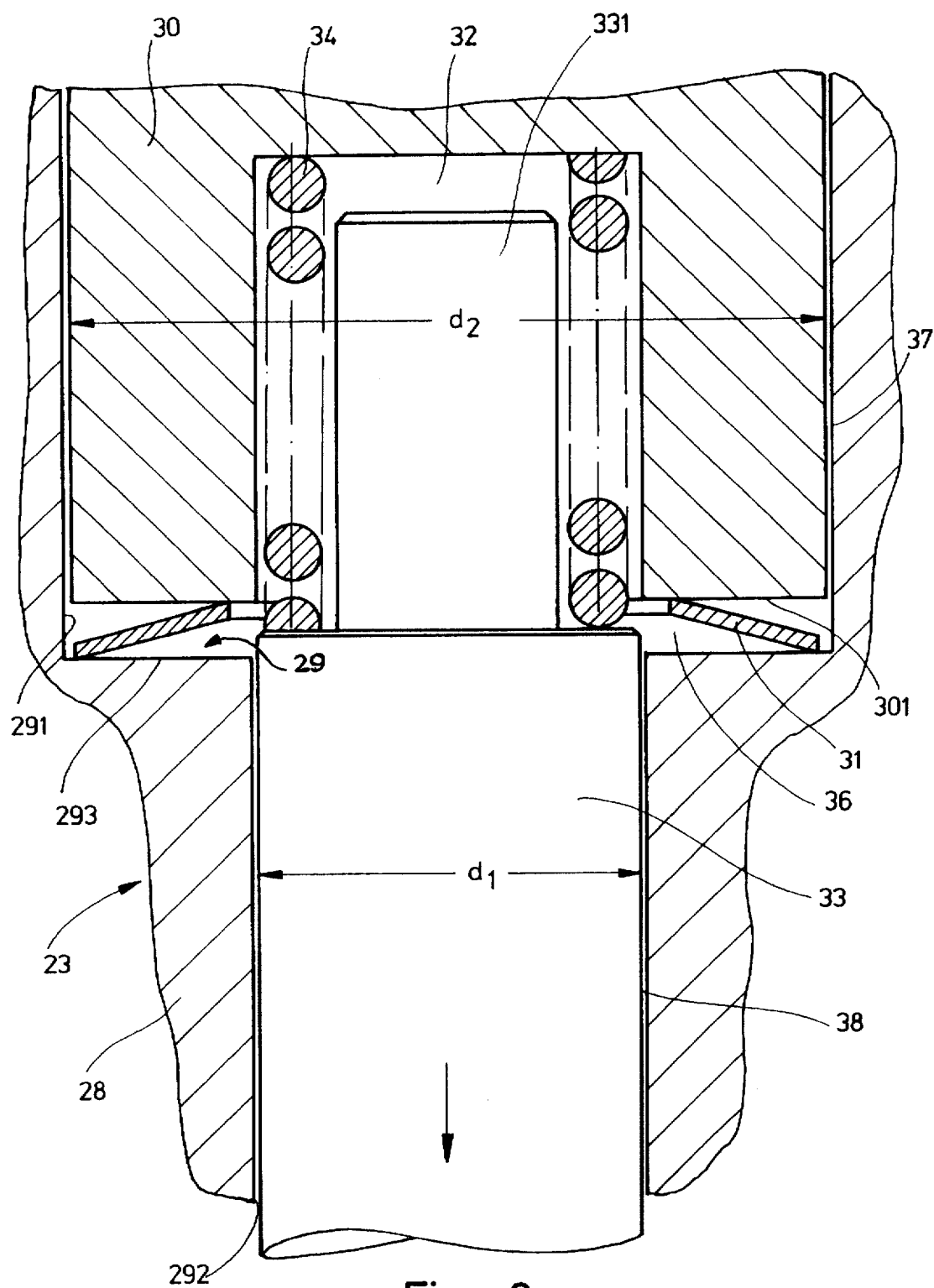
FIG. 2 shows an enlarged representation of the detail II in FIG. 1.

The displacement amplifier 23, which is illustrated on an enlarged scale in FIG. 2, is arranged in a housing insert 28 which forms part of the valve housing 10, is inserted into the central housing part 12 and is supported there on a radial shoulder. The housing insert 28 has a coaxial stepped through-hole 29 with a larger-diameter hole section 291 and a smaller-diameter hole section 292. Guided in axially displaceable fashion in hole section 291 is an operating piston 30 which is pressed against the actuator 25 (FIG. 1) by a Belleville spring 31 supported, on the one hand, on the radial transitional shoulder 293 between the two hole sections 291 and 292 and, on the other hand, on that end face 301 of the operating piston 30 which faces the transitional shoulder 293. The operating piston 30 has a coaxial pocket-type recess 32 introduced into it from its end face 301. Guided in axially displaceable fashion in the smaller-diameter hole section 292 is a lifting piston 33 which, at its end facing the operating piston 30, bears an end section 331 of reduced diameter which projects into the recess 32 in the operating piston 30. A helical compression spring 34 concentrically surrounding the end section 331 is supported, on the one hand, in the bottom of the recess 32 and, on the other hand, on the lifting piston 33. As can be seen from FIG. 1, this helical compression spring 34 presses the lifting piston 33 against the valve needle 21. In order to reduce the mass of the lifting piston 33 and enable the movement of the valve needle 21 to be measured inductively, the diameter of its other end section, that remote from end section 331, is reduced to give a thin actuating pin 35 (FIG. 1). Enclosed in the larger-diameter hole section 291, between the operating piston 30 and the lifting piston 33, is a liquid-filled amplifier chamber 36 by means of which an actuating displacement of the operating piston 30 is transformed into an amplified stroke of the lifting piston 33. If, as indicated in FIG. 2, the diameter of the operating piston 30 is $d_2$ and the diameter of the lifting piston 33 is $d_1$, the geometric transformation or amplification ratio is $m=(d_2/d_1)^2$.

Respective annular or hollow-cylindrical restrictor gaps 37 and 38 are provided between the operating piston 30 and the inner wall of hole section 291 and between the lifting piston 33 and the inner wall of hole section 292. Via these restrictor gaps 37, 38, the amplifier chamber 36 is connected to a liquid-filled low-pressure space 39 which includes the interior of housing parts 12 and 13. A radial hole 40 in the housing insert 28 which emerges into the smaller-diameter hole section 292 ensures a connection between the restrictor gap 38 and the low-pressure space 39. The total liquid-filled volume occupied by the amplifier chamber 36, the restrictor gaps 37, 38 and the low-pressure space 39 is under a pressure of 2–50 bar. The restrictor gaps 37, 38 are dimensioned in such a way that only quasi-static processes such as changes in the length of the actuator 25, the valve needle 21 or the amplifier pistons 30, 33 due to temperature effects, wear and manufacturing tolerances bring about a displacement of the amplifier pistons 30, 33 by displacement of liquid via the restrictor gaps 37, 38, and, as a result, the constant actuating displacement of the actuator 25 is not affected. Brief dynamic pressure effects, on the other hand, such as those which are generated by the expansion of the actuator 25 when an excitation voltage is applied, encounter a completely incompressible and constant-volume liquid cushion in the amplifier chamber 36 and the change in length of the actuator 25 is thus transmitted to the lifting piston 33 and hence to the valve needle 21 with the amplification ratio m.

Figure 3:
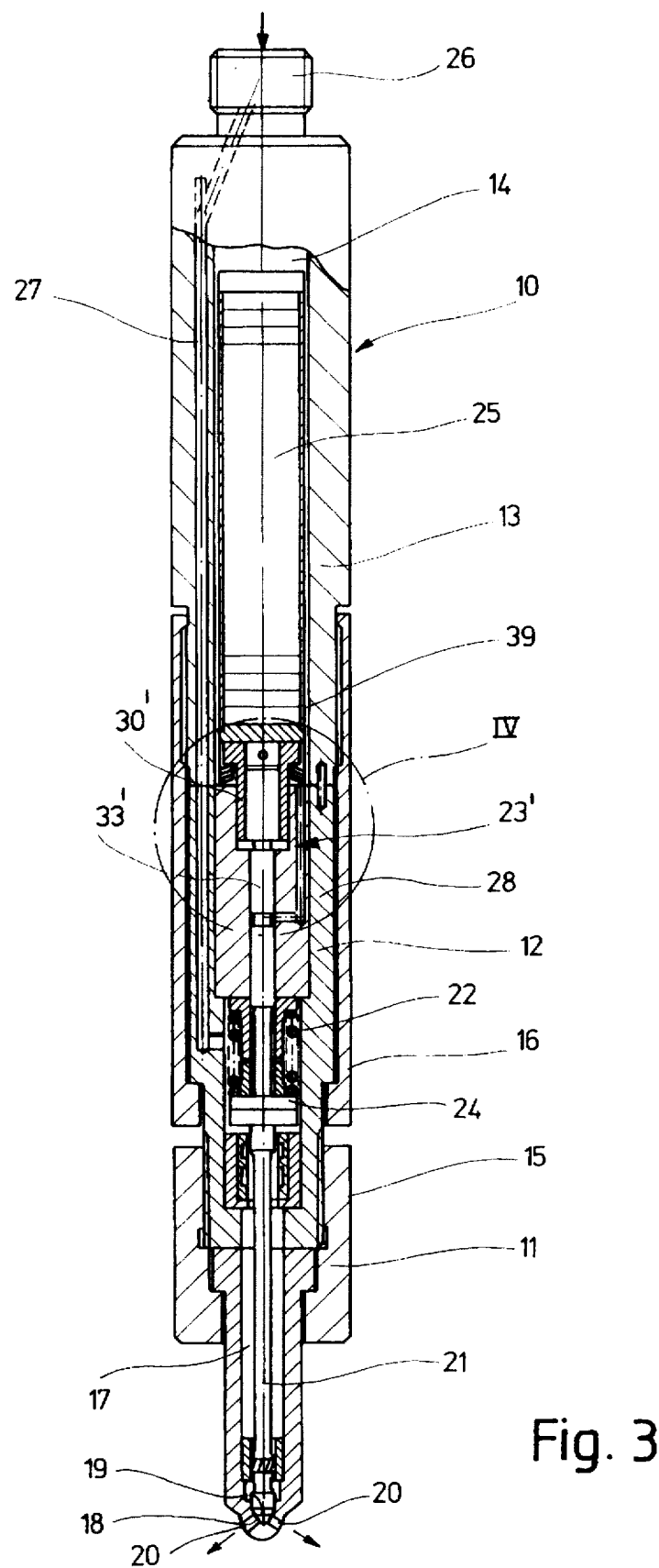
FIG. 3 shows a longitudinal section of a fuel injection valve designed as an I-valve.

FIG. 3 shows, in longitudinal section, a fuel injection valve of the "T" type, in which, in contrast to the injection valve of the O type, the valve seat 18 surrounding the metering opening 20 is formed on the inside of the valve body 11 and, to open the valve, the valve needle 21 rises inwards from the valve seat 18. The direction of motion of the valve needle 21 during opening and closure of the valve is thus opposite to the direction of motion of the valve needle 18 in FIG. 1. The injection valve, which again has a valve housing 10 made up of three housing parts 11–13, largely corresponds to the injection valve described with reference to FIG. 1 and identical components are thus provided with identical reference numerals. The valve-closing spring 22 which presses the valve member 19 on the end of the valve needle 21 onto the valve seat 18 is again designed as a helical compression spring, which is here supported on the spring plate 24 rigidly connected to the valve needle 21 and on the housing insert 28 which is inserted into the central housing part 12 and again contains the displacement amplifier 23'. The displacement amplifier 23' again connects the valve needle 21 to the piezoelectric (or magnetostrictive) actuator 25, which lengthens by an actuating displacement when an excitation voltage is applied and raises the valve needle 21 from the valve seat 18 by a corresponding lifting displacement. A fuel injection quantity corresponding to the valve stroke is sprayed out of the fuel-filled axial hole 17 through the metering opening 20.

Figure 4:
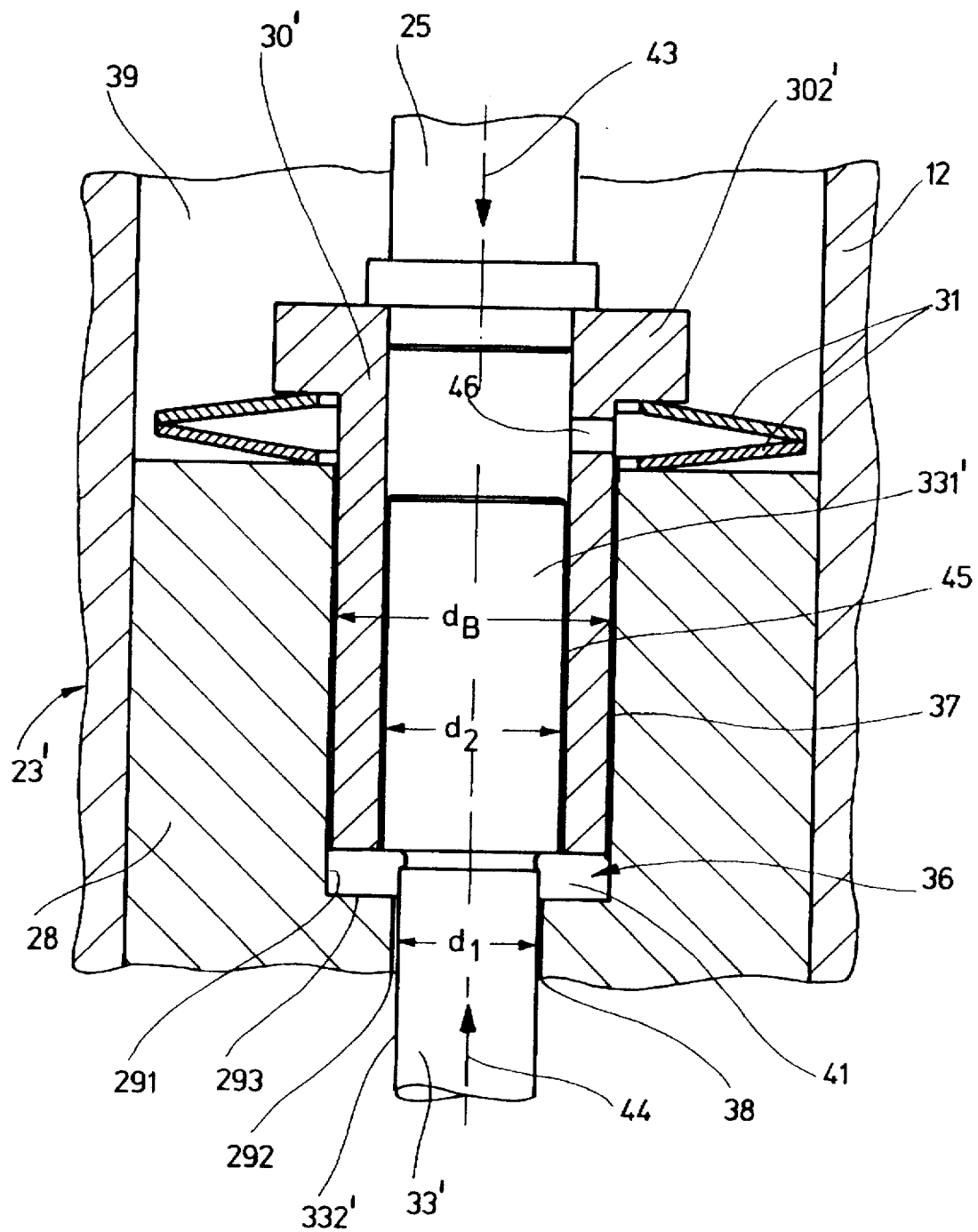
FIG. 4 shows an enlarged representation of the detail IV in FIG. 3, and FIGS. 5 to 7 each show the same view as that in FIG. 4 of a modified fuel injection valve of the I type in accordance with three further exemplary embodiments.

To couple the opposing motions of the actuator 25 and the valve needle 21 during the opening and closure of the injection valve, the displacement amplifier 23' illustrated on an enlarged scale in FIG. 4 is modified in comparison with the displacement amplifier described above. However, identical components are provided with identical reference numerals. The displacement amplifier 23' again has an operating piston 30' and a lifting piston 33' which enclose between them an amplifier chamber 36'. The amplifier chamber 36' here has an annular space 41 which surrounds the lifting piston 33' at the end of the operating piston 30' remote from the actuator 25. The operating piston 30' is pressed against the actuator 25 by two Belleville springs 31 supported on the housing insert 28 and the operating piston 30'.

In the exemplary embodiment illustrated in FIG. 4, the operating piston 30' is of sleeve-shaped or hollow-cylindrical design and is guided in axially displaceable fashion in the larger-diameter hole section 291 of the housing insert 28. The lifting piston 33', which is guided in axially displaceable fashion in the smaller-diameter hole section 292, is guided by its end section 331' in the operating piston 30', the end section 331' having a larger diameter than the lifting-piston section 332' which continues from it. The mentioned annular space 41 of the amplifier chamber 36 is thus bounded at one end by the operating piston 30' and the end section 331' of the lifting piston 33' and, at its other end, by the transitional shoulder 293 between the hole sections 291, 292 in the housing insert 28. The diameter designations $d_1$ for the lifting-piston section 332', $d_2$ for the end section 331' of the lifting piston 33' and $d_3$ for the outside diameter of the operating piston 30' which are entered in FIG. 4 give a transformation or amplification ratio $m'=d_3^2-d_2^2/d^2-d_1^2$.

If the actuator 25 is excited, it displaces the operating piston 30' by an actuating displacement in the direction of arrow 43 in FIG. 4. By means of the displacement amplifier 23' with the amplification ratio m', the lifting piston 33' and the valve needle 21 integral with it are displaced by a correspondingly larger stroke in the direction of arrow 44 in FIG. 4. The valve needle 21 is thereby raised from the valve seat 18 and the metering opening 20 freed for fuel injection.

Figure 5:
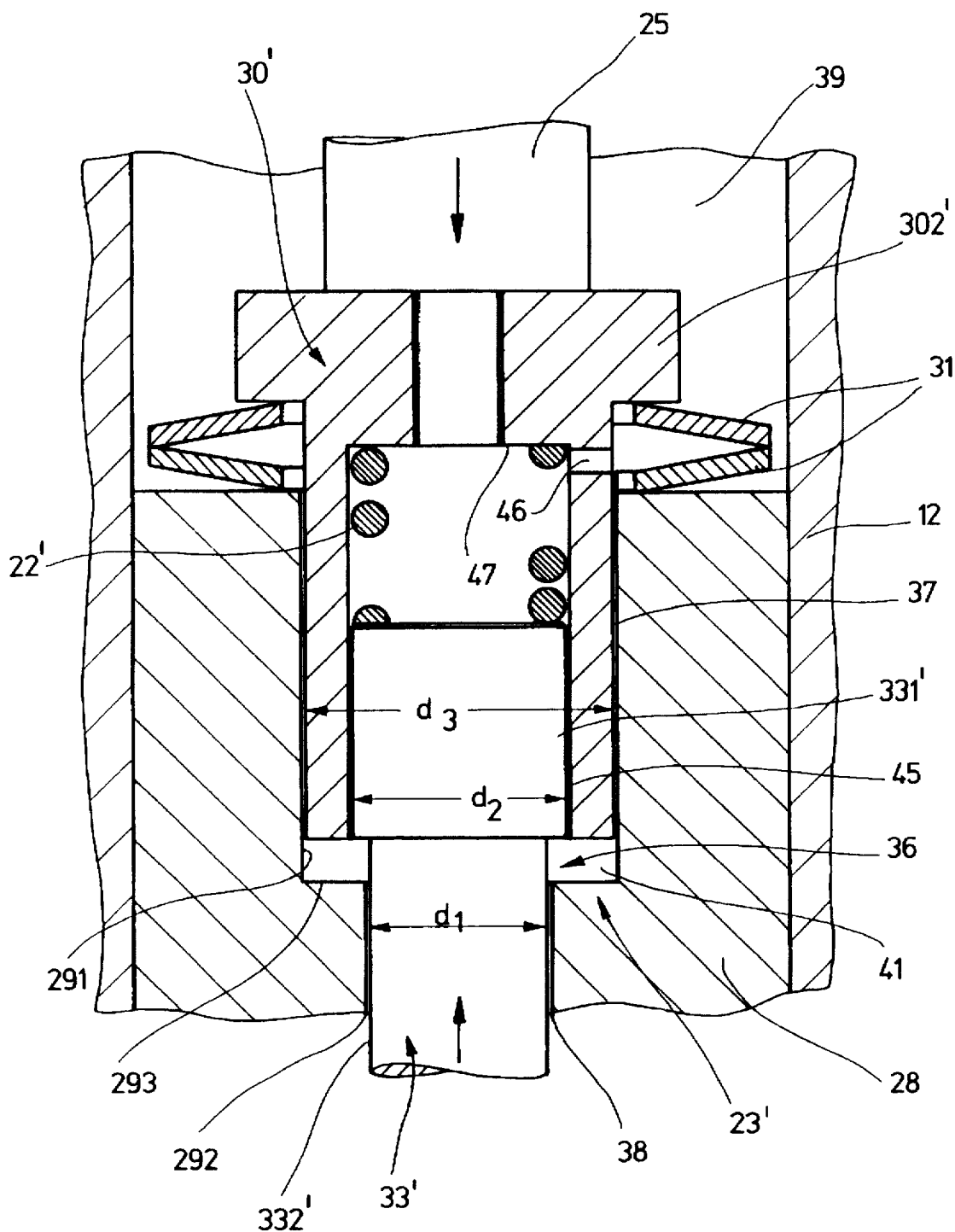

As in the case of the displacement amplifier 23 in FIGS. 1 and 2, compensation of the effects of changes in length of the actuator 25, the valve needle 21 or the amplifier pistons 30', 33' due to temperature changes, wear and manufacturing tolerances is again provided in the case of the displacement amplifier 23' in FIGS. 3 and 4. For this purpose, the hollow-cylindrical restrictor gaps 37, 38 are again provided between the operating piston 30' and the inner wall of the larger-diameter hole section 291 and between the lifting piston 33' and the inner wall of the smaller-diameter hole section 292 and connect the amplifier chamber 36 including annular space 41 to a low-pressure space 39. In addition, a third hollow-cylindrical restrictor gap 45 is provided between the piston sections which slide in one another of the lifting piston 33' and the operating piston 30', i.e. between the end section 331' of the lifting piston 33' and the inner wall of the hollow-cylindrical operating piston 30', and this restrictor gap 45 is likewise filled with liquid and connected to the low-pressure space 39. For this purpose, the hollow-cylindrical operating piston 30' has introduced into it at least one radial hole 46, which opens freely into the interior of the upper housing part 13, which forms part of the low-pressure space 39. The displacement amplifier 23' illustrated on an enlarged scale and in section in FIG. 5 is modified in relation to the displacement amplifier 23' in FIG. 4 inasmuch as the valve-closing spring 22' is integrated into the displacement amplifier 23'. For this purpose a radial shoulder 47 is formed in the interior of the hollow-cylindrical operating piston 30'. The valve-closing spring 22', which is again designed as a helical compression spring, is supported on this radial shoulder 47 and on the end section 331' of the lifting piston 33 and hence on the valve needle 21. All the other components correspond to those in FIG. 4 and are designated by the same reference numerals.

Figure 6:
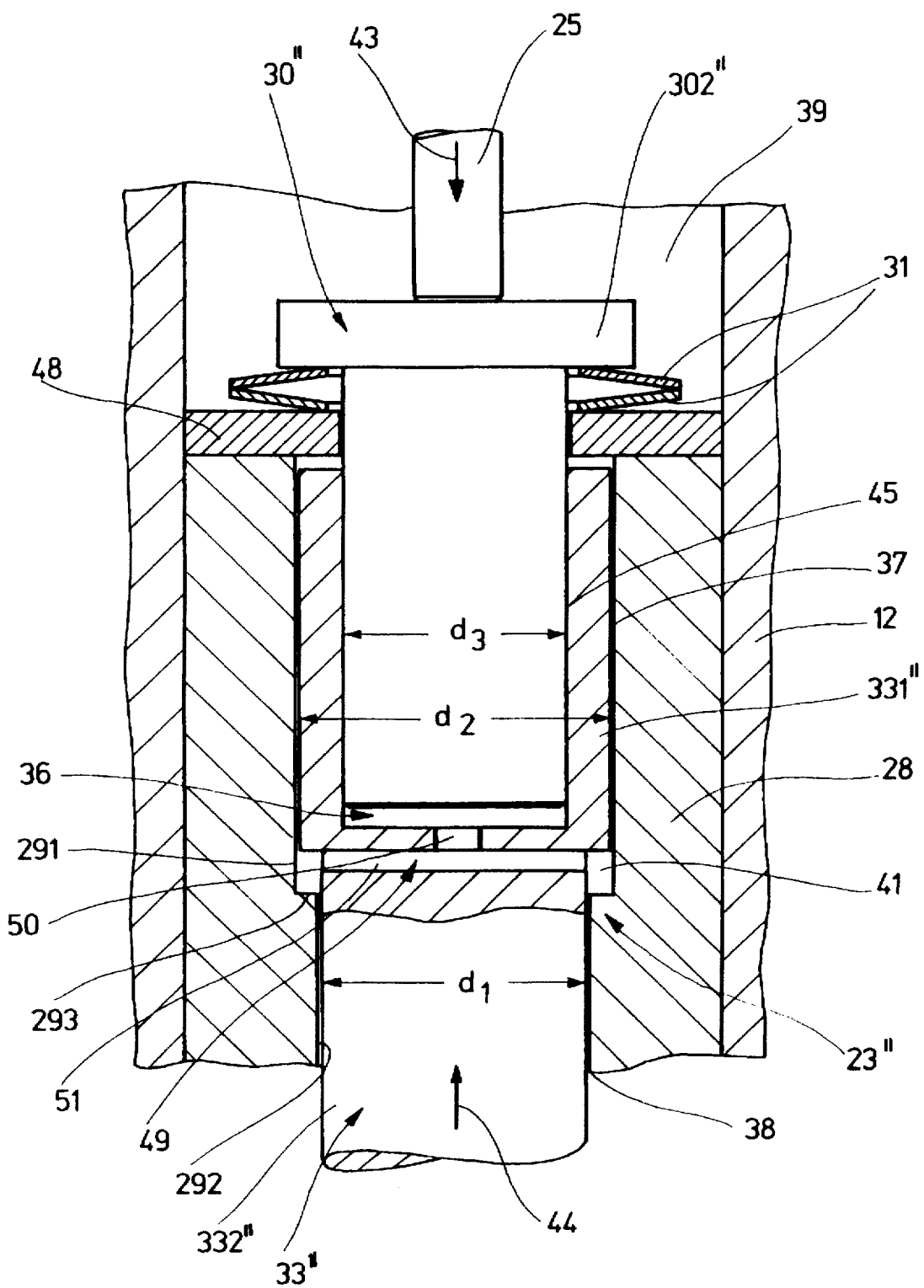

The displacement amplifier 23" sketched in longitudinal section in FIG. 6 can be inserted into the injection valve of the I type shown in FIG. 3 instead of the displacement amplifier 23'. Here, the lifting piston 33" is designed with a cup-shaped end section 331" which is guided in axially displaceable fashion in the larger-diameter hole section 291 in the housing insert 28. Adjoining this end section 331" is a lifting-piston section 332" with a reduced outside diameter $d_1$ in relation to the outside diameter $d_2$ of the end section 331", this lifting-piston section being guided in the smaller-diameter hole section 292 in the housing insert 28. The operating piston 30" is guided in axially displaceable fashion in the interior of the cup of the end section 331" of the lifting piston 33" and is again pressed against the actuator 25 by an assembly of two Belleville springs 31, the Belleville springs 31 being supported on a flange 302' formed on the operating piston 30" and via a washer 48 on the housing insert 28. The amplifier chamber 36 enclosed between the amplifier pistons 30" and 33" again has the annular space 41 which surrounds the lifting-piston section 332" and is connected to the interior of the cup of the end section 331" by way of a connecting hole 49. This connecting hole 49 is made up of a coaxial pocket hole 50, which is introduced at the bottom of the cup-shaped end section 331", and of two diametrically extending radial holes 51, which are introduced into the lifting-piston section 332" and open into the pocket hole 50 and the annular space 41. With the diameters indicated in FIG. 6 for the lifting piston 33" and the operating piston 30', the amplification ratio is given by $m''=d_3^2/d_2^2-d_1^2$. As in the case of the displacement amplifier 23' in FIG. 5, the displacement amplifier 23" shown in FIG. 6 is also provided with the restrictor gaps 37, 38 and 45, which are connected to the low-pressure space 39.

Figure 7:
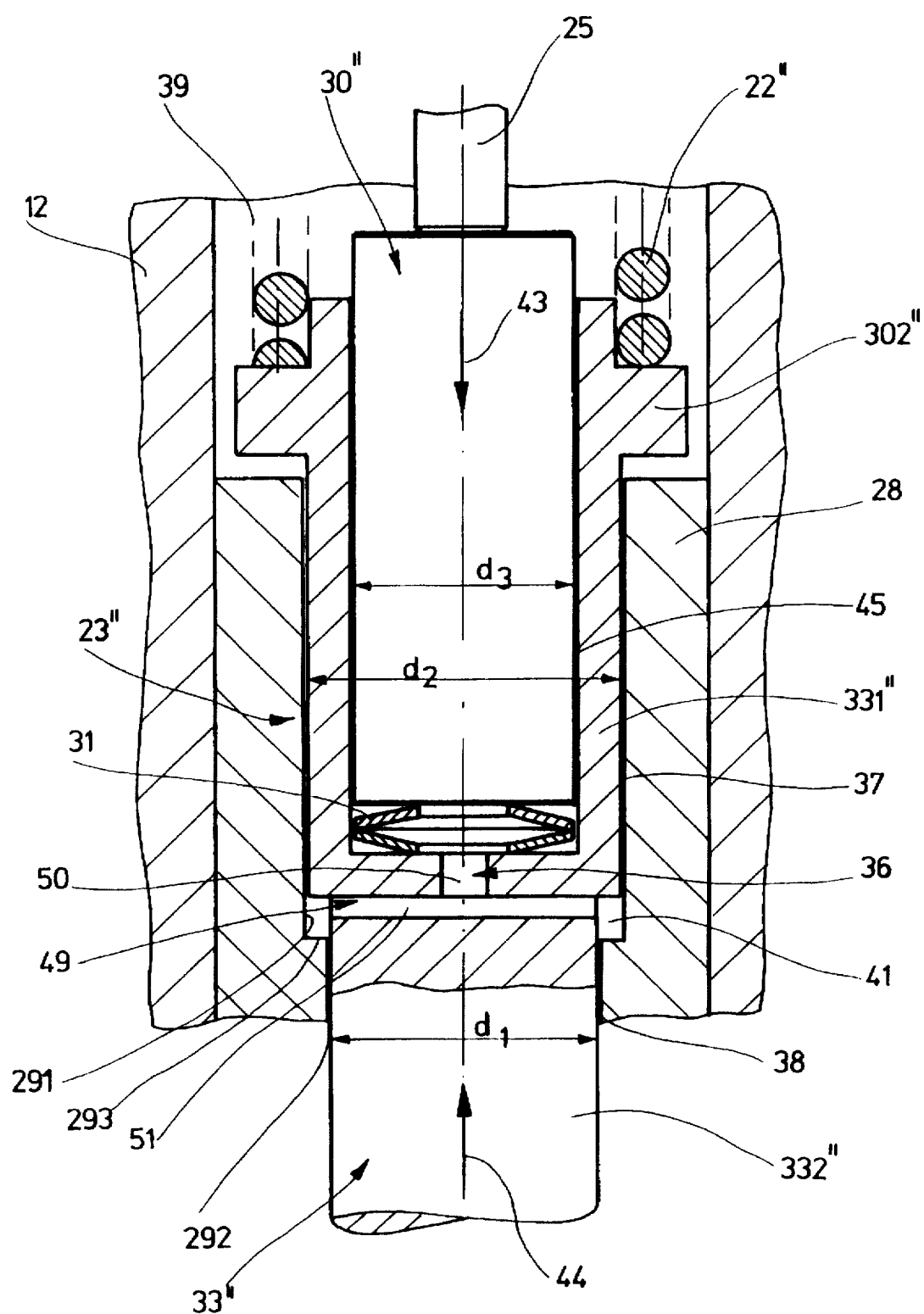

The hydraulic displacement amplifier 23" illustrated schematically in longitudinal section in FIG. 7 is modified in relation to the displacement amplifier 23" described with reference to FIG. 6 only insofar as the Belleville springs 31 which press the operating piston 30" against the actuator 25 are now arranged in the interior of the cup-shaped end section 331" of the lifting piston 33" and are supported, on the one hand, on the cup bottom and, on the other hand, on the end of the operating piston 30" facing the cup bottom. In addition, as a modification in relation to FIG. 3, the valve-closing spring 22, which is there supported on the spring plate 24, can be omitted and, as shown in FIG. 7, integrated into the displacement amplifier 23". The valve-closing spring 22" is here supported on the flange 302", formed on the operating piston 30", and on the actuator 25 and, at the same time, fixes the latter in the upper housing part 13. The construction and mode of operation of the displacement amplifier 23" in FIG. 7 otherwise corresponds to that of the displacement amplifier 23" in FIG. 6, and components which are the same are thus designated by the same reference numerals.

The foregoing relates to preferred exemplary embodiments of the invention, it being understood that other variants and embodiments thereof are possible within the spirit and scope of the invention, the latter being defined by the appended claims.

We claim:

1. Metering valve for metering fluids in a fuel injection system of an internal combustion engines such as direct-injection diesel engines, comprising a valve housing (10) with a metering opening (20), a valve needle (21) which, together with a valve seat (18) surrounding the metering opening (20), controls the metering opening (20), is guided in axially displaceable fashion in the valve housing (10) and is pressed onto the valve seat (18) under the action of a valve-closing spring (22), a piezoelectric or magnetostrictive actuator (25) which displaces the valve needle (21) axially counter to a closing force of the valve-closing spring (22), and a hydraulic displacement amplifier (23) which converts a rapid change in length of the actuator (25) into a larger stroke of the valve needle (21) and, for this purpose, has an operating piston (30) coupled to the actuator (25), a lifting piston (33) coupled to the valve needle (21), and an amplifier chamber (36) enclosed in the valve housing (10) by the operating and lifting pistons (30, 33) with different piston areas that are guided in axially displaceable fashion therein, in which, for its use as a rapid, outward-opening valve with the valve seat (18) arranged on the outside of the housing (10), the lifting piston (33), which is of small-mass design, projects with an end section (331) of reduced diameter into a recess (32) in the operating piston (30), and a first compression spring (31), which presses the operating piston (30) against the actuator (25) and is designed as a flat spring, is supported on the operating piston (30) and on the valve housing (10), and a second compression spring (34), which presses the lifting piston (33) against the valve needle (21) in the opposite direction and is supported on the lifting piston (33) and on the bottom of the recess (32) in the operating piston (30), are arranged in the amplifier chamber (36).

2. A metering valve as claimed in claim 1, in which a liquid-filled, hollow-cylindrical restrictor gap (37, 38) is provided between the operating piston (30) and the valve housing (10) and between the lifting piston (33) and the valve housing (10), and in that the amplifier chamber (36) is connected by the restrictor gaps (37, 38) to a liquid-filled low-pressure space (39).

3. A metering valve as claimed in claim 2, in which the pressure in the amplifier chamber (36) is made greater than the vapour pressure of the liquid filling the amplifier chamber (36).

4. Metering valve for metering fluids in a fuel injection system of an internal combustion engine, comprising a valve housing (10) with a metering opening (20), a valve needle (21) which, together with a valve seat (18) surrounding the metering opening (20), controls the metering opening (20), is guided in axially displaceable fashion in the valve housing (10) and is pressed onto the valve seat (18) under the action of a valve-closing spring (22), a piezoelectric or magnetostrictive actuator (25) which displaces the valve needle (21) axially counter to a closing force of the valve-closing spring (22), and a hydraulic displacement amplifier (23) which converts a rapid change in length of the actuator (25) into a larger stroke of the valve needle (21) and, for this purpose, has an operating piston (30) coupled to the actuator (25), a lifting piston (33) coupled to the valve needle (21), and an amplifier chamber (36) enclosed in the valve housing (10) by the operating and lifting pistons (30, 33) with different piston areas that are guided in axially displaceable fashion therein, in which, for its use as a rapid, inward-opening valve with the valve seat (18) arranged in the interior of the housing (10), the lifting piston (33', 33") is rigidly connected to the valve needle (21), the lifting piston and the operating piston (30', 33', 30", 33") are arranged concentrically to one another, the amplifier chamber (36) has an annular space (41) which surrounds the lifting piston (33', 33") at an end of the operating piston (30', 30") which is remote from the actuator (25), and a compression spring (31) which presses the operating piston (30', 30") against the actuator (25) and is designed as a flat spring supported on the operating piston (30, 30") and on the valve housing (10).

5. A metering valve as claimed in claim 4, in which the operating piston (30') is of hollow-cylindrical design, and the lifting piston (33') is guided in axially displaceable fashion by an end section (331') in the operating piston (30'), in that the end section (331') of the lifting piston (33'), is adjoined by a lifting-piston section (332') with a diameter that is reduced in comparison, and in that the annular space (41) of the amplifier chamber (36) surrounds the reduced-diameter lifting-piston section (332'), and is bounded at one end by the hollow-cylindrical operating piston (30') and the end section (331') of the lifting piston (33') and, at its other end, by the valve housing (10).

6. A metering valve as claimed in claim 5, in which a respective liquid-filled, hollow-cylindrical restrictor gap (37, 38, 45) is provided between the operating piston (30'; 30") and the valve housing (10), between the lifting piston (33'; 33") and the valve housing (10) and between the concentric sections, sliding upon one another, of the operating piston and the lifting piston (30', 33'; 30", 33"), and in that the amplifier chamber (36) including the annular space (41) is connected to a liquid-filled low-pressure space (39) by the restrictor gaps (37, 38, 45).

7. A metering valve as claimed in claim 5, in which, near to an end facing the actuator (25), the hollow-cylindrical operating piston (30') has an inward-projecting radial shoulder (47), and in that the valve-closing spring (22') is supported on the radial shoulder (478) and on that end of the lifting piston (33') which faces this radial shoulder.

8. A metering valve as claimed in claim 7, in which the pressure in the amplifier chamber (36) is made greater than the vapour pressure of the liquid filling the amplifier chamber (36).

9. A metering valve as claimed in claim 7, in which a respective liquid-filled, hollow-cylindrical restrictor gap (37, 38, 45) is provided between the operating piston (30'; 30") and the valve housing (10), between the lifting piston (33'; 33") and the valve housing (10) and between the concentric sections, sliding upon one another, of the operating piston and the lifting piston (30', 33'; 30", 33"), and in that the amplifier chamber (36) including the annular space (41) is connected to a liquid-filled low-pressure space (39) by the restrictor gaps (37, 38, 45).

10. A metering valve as claimed in claim 4, in which the lifting piston (33") has an end section (331") of cup-shaped design in which the operating piston (30") is guided in axially displaceable fashion, and has a lifting-piston section (332") which adjoins it and the outside diameter of which is reduced relative to the outside diameter of the end section (331"), and in that the annular space (41) of the amplifier chamber (36) surrounds the reduced-diameter lifting-piston section (332"), is bounded at one end by the end section (331") of the lifting piston (33") and, at its other end, by the valve housing (10), and is connected to the interior of the cup of the end section (331") by way of at least one large-diameter connecting hole (49).

11. A metering valve as claimed in claim 10, in which the large-diameter connecting hole (49) has at least one axial pocket hole (50), which is sunk into a bottom of the cup-shaped end section (331") of the lifting piston (33"), and at least one radial hole (51) which opens into the said pocket hole and is introduced into the lifting-piston section (332") of reduced diameter.

12. A metering valve as claimed in claim 11, in which the pressure in the amplifier chamber (36) is made greater than the vapour pressure of the liquid filling the amplifier chamber (36).

13. A metering valve as claimed in claim 11, in which the compression spring which presses the operating piston (30") against the actuator (35) is supported on the inner cup bottom of the end section (331") of the lifting piston (33") instead of on the valve housing (10).

14. A metering valve as claimed in claim 11, in which a respective liquid-filled, hollow-cylindrical restrictor gap (37, 38, 45) is provided between the operating piston (30'; 30") and the valve housing (10), between the lifting piston (33'; 33") and the valve housing (10) and between the concentric sections, sliding upon one another, of the operating piston and the lifting piston (30', 33'; 30", 33"), and in that the amplifier chamber (36) including the annular space (41) is connected to a liquid-filled low-pressure space (39) by the restrictor gaps (37, 38, 45).

15. A metering valve as claimed in claim 10, in which the compression spring which presses the operating piston (30") against the actuator (35) is supported on the inner cup bottom of the end section (331") of the lifting piston (33") instead of on the valve housing (10).

16. A metering valve as claimed in claim 15, in which the pressure in the amplifier chamber (36) is made greater than the vapour pressure of the liquid filling the amplifier chamber (36).

17. A metering valve as claimed in claim 15, in which a respective liquid-filled, hollow-cylindrical restrictor gap (37, 38, 45) is provided between the operating piston (30'; 30") and the valve housing (10), between the lifting piston (33'; 33") and the valve housing (10) and between the concentric sections, sliding upon one another, of the operating piston and the lifting piston (30', 33'; 30", 33"), and in that the amplifier chamber (36) including the annular space (41) is connected to a liquid-filled low-pressure space (39) by the restrictor gaps (37, 38, 45).

18. A metering valve as claimed in claim 4, in which a respective liquid-filled, hollow-cylindrical restrictor gap (37, 38, 45) is provided between the operating piston (30'; 30") and the valve housing (10), between the lifting piston (33'; 33") and the valve housing (10) and between the concentric sections, sliding upon one another, of the operating piston and the lifting piston (30', 33'; 30", 33"), and in that the amplifier chamber (36) including the annular space (41) is connected to a liquid-filled low-pressure space (39) by the restrictor gaps (37, 38, 45).

19. A metering valve as claimed in claim 4, in which the pressure in the amplifier chamber (36) is made greater than the vapour pressure of the liquid filling the amplifier chamber (36).

20. A metering valve as claimed in claim 1, in which the pressure in the amplifier chamber (36) is made greater than the vapour pressure of the liquid filling the amplifier chamber (36).

* * * * *